United States Patent
Davi et al.

(10) Patent No.: US 9,803,793 B2
(45) Date of Patent: Oct. 31, 2017

(54) METHOD FOR LATERALLY MOVING INDUSTRIAL MACHINE

(71) Applicant: General Electric Company, Schenectady, NY (US)

(72) Inventors: Michael Alan Davi, Niskayuna, NY (US); Jayan Kaadaapuram George, Glenville, NY (US); Matthew Robert Martin, Schenectady, NY (US); Sean Cornelius O'Meara, Schenectady, NY (US); John Russell Yagielski, Scotia, NY (US)

(73) Assignee: GENERAL ELECTRIC COMPANY, Schenectady, NY (US)

(*) Notice: Subject to any disclaimer, the term of this patent is extended or adjusted under 35 U.S.C. 154(b) by 99 days.

(21) Appl. No.: 14/737,527

(22) Filed: Jun. 12, 2015

(65) Prior Publication Data

US 2016/0161049 A1    Jun. 9, 2016

Related U.S. Application Data

(60) Provisional application No. 62/088,153, filed on Dec. 5, 2014.

(51) Int. Cl.
*B66F 19/00* (2006.01)
*F16M 5/00* (2006.01)
(Continued)

(52) U.S. Cl.
CPC ............... *F16M 1/00* (2013.01); *F01D 25/28* (2013.01); *F16M 1/026* (2013.01); *F16M 5/00* (2013.01);
(Continued)

(58) Field of Classification Search
CPC ........ F16M 1/2058; F16M 1/00; F16M 1/026; F16M 2200/08
(Continued)

(56) References Cited

U.S. PATENT DOCUMENTS

3,460,686 A * 8/1969 Cole ....................... B63B 27/10
                                                414/139.9
4,572,474 A    2/1986 Derlich
(Continued)

FOREIGN PATENT DOCUMENTS

EP        0741445 A2    11/1996
EP        1336753 A2     8/2003
(Continued)

OTHER PUBLICATIONS

Combined Search and Examination Report issued in connection with corresponding GB Application No. GB1520670.9 dated May 13, 2016.
(Continued)

*Primary Examiner* — Tan Le
(74) *Attorney, Agent, or Firm* — Ernest G. Cusick; Hoffman Warnick LLC

(57) ABSTRACT

A method for laterally moving an industrial machine is provided. The method may include: supporting the industrial machine on a pair of rail elements configured to be positioned laterally below and support the industrial machine, the rail elements allowing the industrial machine to be moved laterally from a first operative position to a second, maintenance position. A pair of linear actuators configured to laterally move the industrial machine from the first, operative position to the second, maintenance position.

18 Claims, 15 Drawing Sheets

(51) Int. Cl.
*F16M 7/00* (2006.01)
*F01D 25/28* (2006.01)
*F16M 1/00* (2006.01)
*F16M 1/026* (2006.01)

(52) U.S. Cl.
CPC ............ *F16M 7/00* (2013.01); *F16M 2200/08* (2013.01); *Y02T 50/672* (2013.01)

(58) Field of Classification Search
USPC .......... 310/91, 426, 427; 414/758, 800, 925; 248/637, 646, 673, 678; 29/407.09, 29/407.1, 426.5, 596
IPC ............. F01D 25/28; F02C 7/20; F02B 63/04; F16M 5/00,7/00, 9/00, 11/20; H02K 5/00, 5/02; B66F 19/00, 13/08
See application file for complete search history.

(56) References Cited

U.S. PATENT DOCUMENTS

| | | | |
|---|---|---|---|
| 5,331,243 A | 7/1994 | Halbohm | |
| 5,701,731 A | 12/1997 | Brem et al. | |
| 5,811,908 A | 9/1998 | Iwata et al. | |
| 6,023,828 A | 2/2000 | Iwata et al. | |
| 6,467,147 B2 | 10/2002 | Iwata et al. | |
| 7,281,308 B2 | 10/2007 | Ashar et al. | |
| 7,744,332 B2* | 6/2010 | Martin | B30B 9/3046 414/340 |
| 8,564,165 B2* | 10/2013 | Rinaolo | B66F 7/10 248/637 |
| 8,621,873 B2 | 1/2014 | Robertson et al. | |
| 8,672,606 B2 | 3/2014 | Glynn et al. | |
| 9,366,268 B2 | 6/2016 | Maier et al. | |
| 2002/0047421 A1 | 4/2002 | Iwata et al. | |
| 2005/0150095 A1 | 7/2005 | Ashar et al. | |
| 2010/0150693 A1 | 6/2010 | Frassinelli et al. | |
| 2012/0012310 A1* | 1/2012 | Friesen | C10L 3/10 166/267 |
| 2012/0228974 A1 | 9/2012 | Rinaolo et al. | |
| 2013/0187303 A1* | 7/2013 | Robbins | B29C 47/802 264/39 |
| 2013/0341002 A1* | 12/2013 | Flusche | E21B 7/02 166/77.52 |
| 2015/0144761 A1* | 5/2015 | Davi | F16M 11/046 248/542 |
| 2016/0123094 A1* | 5/2016 | Amezaga | E21B 19/165 166/380 |
| 2016/0161049 A1* | 6/2016 | Davi | F16M 11/2085 414/800 |

FOREIGN PATENT DOCUMENTS

| | | |
|---|---|---|
| EP | 1337027 A2 | 8/2003 |
| EP | 1337028 A2 | 8/2003 |
| EP | 1336753 B1 | 7/2006 |
| GB | 2534661 * | 3/2016 |
| WO | 2016032998 A1 | 3/2016 |

OTHER PUBLICATIONS

Extended European Search Report and Opinion issued in connection with related EP Application No. 6173957.8 dated Nov. 4, 2016.
U.S. Appl. No. 14/737,524, filed Jun. 12, 2015, Davi et al.
U.S. Appl. No. 14/737,524, Office Action 1 dated Feb. 28, 2017, 20 pages.
U.S. Appl. No. 14/737,524, Final Office Action 1 dated Aug. 11, 2017, 12 pages.

* cited by examiner

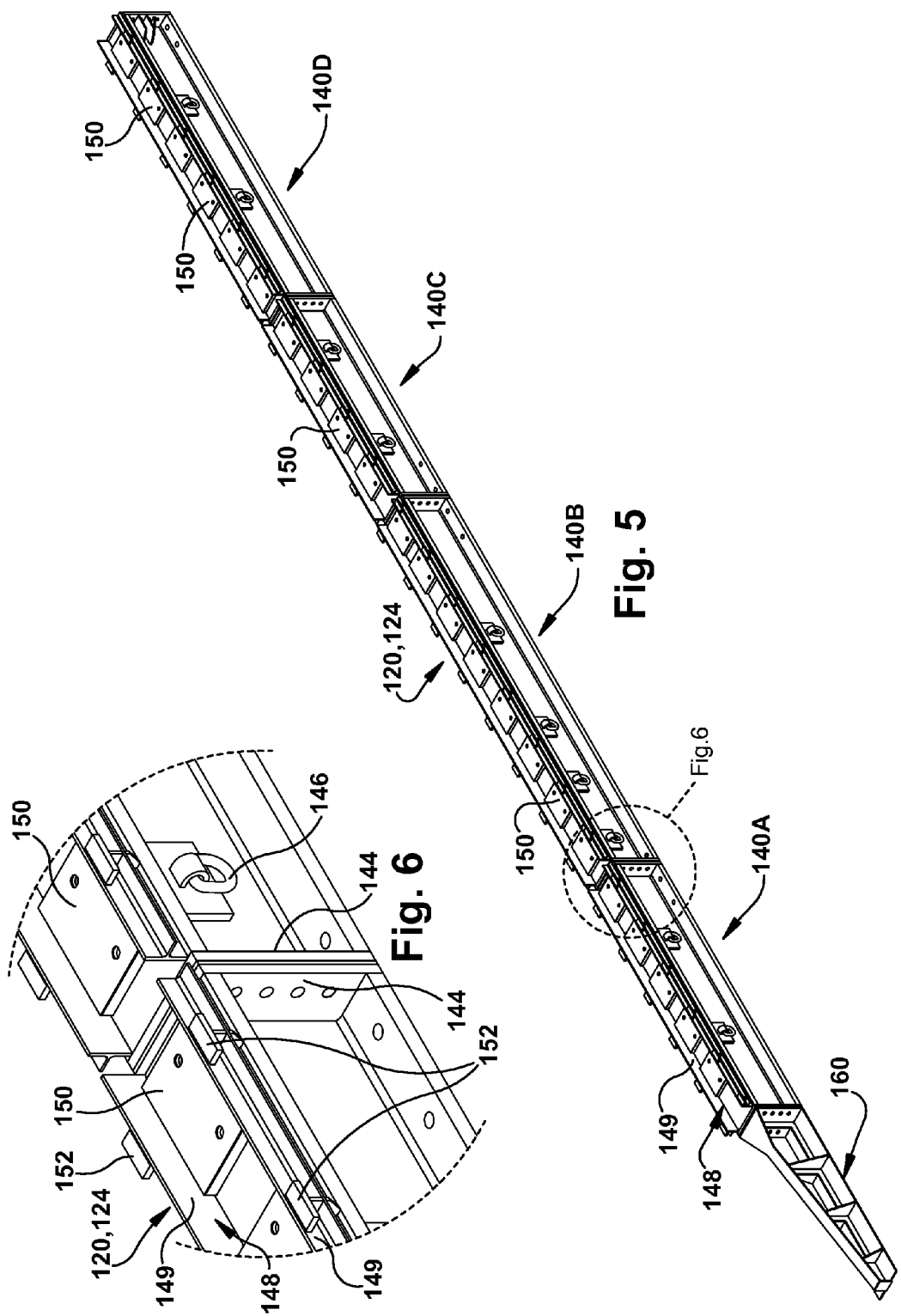

METHOD FOR LATERALLY MOVING INDUSTRIAL MACHINE

CROSS-REFERENCE TO RELATED APPLICATIONS

This application claims priority to U.S. Patent Provisional Application No. 62/088,153 filed on Dec. 5, 2014. The application identified above is incorporated herein by reference in its entirety for all that it contains in order to provide continuity of disclosure.

BACKGROUND OF THE INVENTION

The disclosure relates to a method for moving an industrial machine for maintenance such as a generator from an aligned single shaft gas turbine-generator-steam turbine configuration.

Large industrial machines such as a gas turbine, generator and steam turbine are often aligned with other structures for operation. For example, the gas turbine, generator and steam turbine may be axially aligned in a single shaft configuration one with the other with the generator located between the gas and steam turbines whereby the turbines drive the generator rotor to produce electric power. This configuration is known as a single shaft STAG (steam and gas) combined-cycle system. In the single shaft STAG combined-cycle system, it will be appreciated that the opposite ends of the generator are mechanically coupled to the gas and steam turbines, respectively. The generators of these systems, similar to other industrial machines, are generally mounted on foundations prepared for supporting these large system generators. Typically, large industrial machines or parts thereof such as the generator rotor, i.e., the generator field, must be removed from the machines for scheduled maintenance or repair. In terms of the generator example, with the three main rotating components of the single shaft combined-cycle system secured to the foundation, and in axial alignment one with the other parts, it is not possible to remove the generator field axially due to the lack of clearance with respect to the turbines at opposite ends of the generator. Maintenance on the gas and steam turbines can typically be performed in situ because the turbine housings are split along a horizontal midline enabling removal of each upper casing, exposing the rotors of the gas and steam turbines. This leaves the lower turbine casings resting on the foundation. However, because the generator is an electro-magnetic generator, it is not typically possible to split the generator rotor and casing at the centerline and lift the generator rotor from the generator in a vertical direction. Similar clearance limitations plague maintenance of other industrial machines.

With regard to generators, prior maintenance has been performed on rotors in single shaft combined-cycle systems, primarily in three ways. Once the generators are mechanically uncoupled from the turbines, the generators are directly lifted (via gantry or crane) from the foundation and moved to a laydown area in the plant where rotor removal in an axial direction is not hindered by the presence of other equipment. Often it is necessary to bring in specialized heavy-duty lifting equipment for these lifts as on-site lift capability is usually inadequate to perform such lifts. Another prior process for maintaining generator rotors requires a movable slab forming part of the foundation for the generator. With the generator located on the movable slab, the generator may be displaced transversely or laterally from between the turbines and thus moved to a position where the turbines do not interfere with axial removal of the generator field. Another prior process mounts the generator on special foundations having removable portions that allow installation of guides that allow rotation of the generator about a vertical axis, thus allowing removal of the generator field. Similar complex configurations are used widely for other forms of large industrial machines.

BRIEF DESCRIPTION OF THE INVENTION

A first aspect of the disclosure provides a system for laterally moving an industrial machine for maintenance, the system comprising: a pair of rail elements configured to be positioned laterally below and support the industrial machine, the rail elements allowing the industrial machine to be moved laterally from a first operative position to a second, maintenance position; and a pair of linear actuators configured to laterally move the industrial machine as from the first, operative position to the second, maintenance position.

A second aspect of the disclosure provides a system for laterally moving an industrial machine of a power plant for maintenance, the system comprising: a first skid configured to couple laterally to an underside of the industrial machine at a first axial position; a second skid configured to couple laterally to an underside of the industrial machine at a second axial position; a first segmented support rail for positioning in sliding, aligned contact with the first skid and configured to be supported on a first machine foundation; a second segmented support rail for positioning in sliding, aligned contact with the second skid and configured to be positioned on a second machine foundation, each segmented support rail extending a distance beyond a periphery of the industrial machine on at least one end; and a pair of linear actuators configured to laterally move the industrial machine as each skid slides along a respective segmented support rail.

A further embodiment may include a support rail extender for temporary coupling to a first segment of a selected segmented support rail for spanning a gap between a pair of opposing piers of one of the machine foundations during installation of the selected segmented support rail.

A further embodiment may include each segment of the segmented support rails including at least one removable skid plate.

A further embodiment may provide at least one segment of a selected segmented support rail having a different length than at least one other segment of the selected segmented support rail.

An additional embodiment may include each skid including: a beam; and a skid member at each end of the beam, each skid member including a mount for coupling the skid member to a foot of the industrial machine and an opposing, skid plate for sliding engagement with a respective segmented support rail.

A further embodiment may include each skid member further including an actuator coupling for selective coupling to one of the pair of linear actuators.

Another further embodiment may provide the pair of linear actuators including a first linear actuator coupled between the first segmented support rail and the first skid, and a second linear actuator coupled between the second segmented support rail and the second skid, and wherein the first and second linear actuator are synchronized with one another.

A further embodiment may include each segmented support rail including a plurality of spaced teeth extending along a length thereof, and each linear actuator including a linear actuating mechanism and a stepper sequentially engaging with the plurality of teeth to step the linear actuator along the segmented support rail.

A further embodiment may provide a plurality of climbing jacks for raising the industrial machine in a synchronized manner to a raised position above the first and second machine foundations, allowing installation of the first and second skids and the first and second segmented support rails.

An additional embodiment may include cribbing for supporting the industrial machine during raising thereof to the raised position.

Another further embodiment may include each machine foundation including a pair of opposing piers on opposing sides of the industrial machine, each support rail spanning a space between a respective pair of opposing piers in operation.

A further embodiment may provide a support member for coupling opposing feet of the industrial machine together.

Another embodiment may include a support rail for supporting a portion of a respective support rail extending beyond a respective machine foundation.

Another embodiment may include one of the skids and the segmented support rails including a channel into which the other one of the skid and the segmented support rail is engaged.

Another embodiment may include each segment of the segmented support rails including a plurality of lift rings or eyes.

Another embodiment may provide at least one of the segments of each segmented support rail including a plurality of fastener openings for coupling the at least one segment to a respective machine foundation.

A third aspect may include a system for laterally moving an industrial machine for maintenance, the system comprising: a pair of segmented rail elements configured to be positioned laterally below and support the industrial machine, the segmented rail elements allowing the industrial machine to be moved laterally from a first operative position to a second, maintenance position, wherein the pair of segmented rail elements includes: a first skid configured to couple laterally to an underside of the industrial machine at a first axial position; a second skid configured to couple laterally to an underside of the industrial machine at a second axial position; a first segmented support rail for positioning in sliding, aligned contact with the first skid and configured to be supported on a first machine foundation; a second segmented support rail for positioning in sliding, aligned contact with the second skid and configured to be positioned on a second machine foundation, each segmented support rail extending a distance beyond a periphery of the industrial machine on at least one end; and a pair of linear actuators configured to laterally move the industrial machine from the first, operative position to the second, maintenance position, and wherein at least one segment of a selected segmented support rail has a different length than at least one other segment of the selected segmented support rail.

A fourth aspect of the disclosure provides a method of laterally moving an industrial machine for maintenance, the method comprising: supporting the industrial machine on a pair of rail elements configured to be positioned laterally below and support the industrial machine, the rail elements allowing the industrial machine to be moved laterally from a first operative position to a second, maintenance position; and moving the industrial machine laterally using a pair of linear actuators configured to laterally move the industrial machine from the first, operative position to the second, maintenance position.

A fifth aspect of the disclosure provides a method of laterally moving an industrial machine for maintenance, the method comprising: raising the industrial machine above a pair of machine foundations, each machine foundation including a pair of opposing piers on opposite lateral sides of the industrial machine; installing a first segmented support rail at a first axial position of the industrial machine and supported laterally by the opposing piers of one of the machine foundations; installing a second segmented support rail at a second axial position of the industrial machine and supported laterally by opposing piers of the other of the machine foundations, each segmented support rail extending a distance beyond a periphery of the industrial machine on at least one end; coupling a first skid laterally to an underside of the industrial machine and in alignment with the first segmented support rail; coupling a second skid laterally to an underside of the industrial machine at a second axial position and in alignment with the second segmented support rail; lowering the industrial machine such that each skid is aligned in contact with a respective support rail; and applying a force to laterally move the industrial machine as each skid slides along a respective segmented support rail.

In one embodiment, the supporting may include: raising the industrial machine above a pair of machine foundations, each machine foundation including a pair of opposing piers on opposite lateral sides of the industrial machine; installing a first segmented support rail at a first axial position of the industrial machine and supported laterally by the opposing piers of one of the machine foundations; installing a second segmented support rail at a second axial position of the industrial machine and supported laterally by opposing piers of the other of the machine foundations, each segmented support rail extending a distance beyond a periphery of the industrial machine on at least one end; coupling a first skid laterally to an underside of the industrial machine and in alignment with the first segmented support rail; coupling a second skid laterally to an underside of the industrial machine at a second axial position and in alignment with the second segmented support rail; lowering the industrial machine such that each skid is aligned in contact with a respective support rail; and wherein the moving includes applying a force to laterally move the industrial machine as each skid slides along a respective segmented support rail.

In another embodiment, each skid coupling may include coupling the skid to a respective, axially displaced foot of the industrial machine.

In yet another embodiment, each segmented support rail installing may include installing the segmented support rail in sequential segments.

Another embodiment may include temporarily coupling a support rail extender to a first segment of a selected segmented support rail for spanning a gap between a pair of opposing piers of one of the machine foundations during the installing of the selected segmented support rail.

In another embodiment, the pair of linear actuators may include a first linear actuator coupled between the first segmented support rail and the first skid, and a second linear actuator coupled between the second segmented support rail and the second skid, and wherein the first and second linear actuator are synchronized with one another. Further, the force applying may include sequentially stepping each linear actuator along a respective segmented support rail.

In another embodiment, the industrial machine raising may include using a plurality of climbing jacks for raising the industrial machine in a synchronized manner to a raised position above the first and second machine foundations.

Another embodiment may include placing cribbing beneath the industrial machine for maintaining the industrial machine in the raised position.

Yet another embodiment may include coupling opposing feet of the industrial machine together with a support member prior to the raising.

A sixth aspect of the invention may provide a method of laterally moving an industrial machine for maintenance, the method comprising: raising the industrial machine above a pair of machine foundations, each machine foundation including a pair of opposing piers on opposite lateral sides of the industrial machine; installing a first segmented support rail at a first axial position of the industrial machine and supported laterally by the opposing piers of one of the machine foundations; installing a second segmented support rail at a second axial position of the industrial machine and supported laterally by opposing piers of the other of the machine foundations, each segmented support rail extending a distance beyond a periphery of the industrial machine on at least one end; coupling a first skid laterally to an underside of the industrial machine and in alignment with the first segmented support rail; coupling a second skid laterally to an underside of the industrial machine at a second axial position and in alignment with the second segmented support rail; lowering the industrial machine such that each skid is aligned in contact with a respective support rail; and moving the industrial machine laterally using a pair of linear actuators, each linear actuator coupled to a respective skid and configured to laterally move the industrial machine from a first, operative position to a second, maintenance position as each skid slides along a respective segmented support rail.

The illustrative aspects or embodiments of the present disclosure are arranged to solve the problems herein described and/or other problems not discussed.

BRIEF DESCRIPTION OF THE DRAWINGS

These and other features of this disclosure will be more readily understood from the following detailed description of the various aspects of the disclosure taken in conjunction with the accompanying drawings that depict various embodiments of the disclosure, in which:

FIG. 5 shows a perspective view of a segmented support rail of the system according to embodiments of the invention.

FIG. 6 shows an enlarged perspective view of a detail of a segmented support rail of FIG. 5.

It is noted that the drawings of the disclosure are not to scale. The drawings are intended to depict only typical aspects of the disclosure, and therefore should not be considered as limiting the scope of the disclosure. In the drawings, like numbering represents like elements between the drawings.

DETAILED DESCRIPTION OF THE INVENTION

As indicated above, the disclosure provides a system and method for laterally moving an industrial machine, such as a generator in a power plant, for maintenance.

Figure 1:
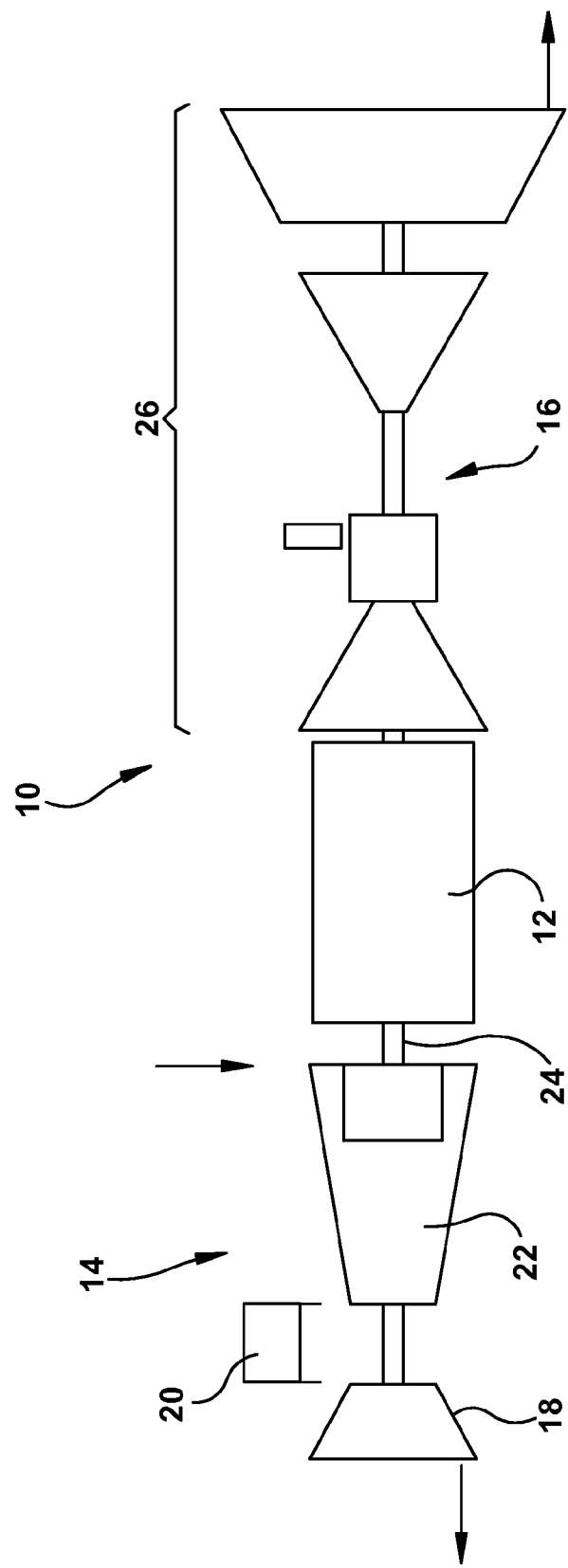
FIG. 1 shows a schematic view of a conventional single shaft STAG combined-cycle system.
Figure 2:
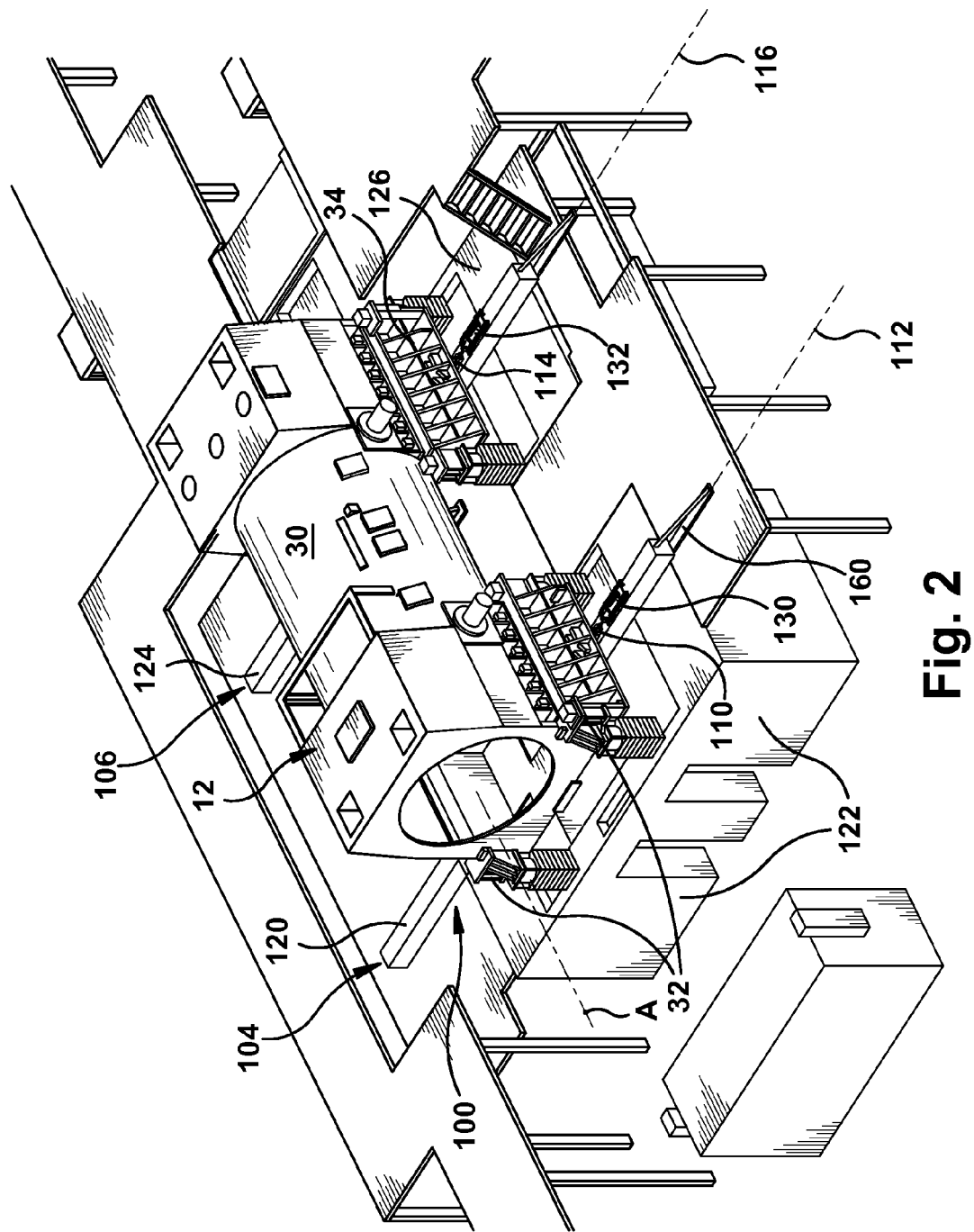
FIG. 2 shows a perspective view of a system for laterally moving an industrial machine such as a generator prior to the lateral moving according to embodiments of the invention.
Figure 3:
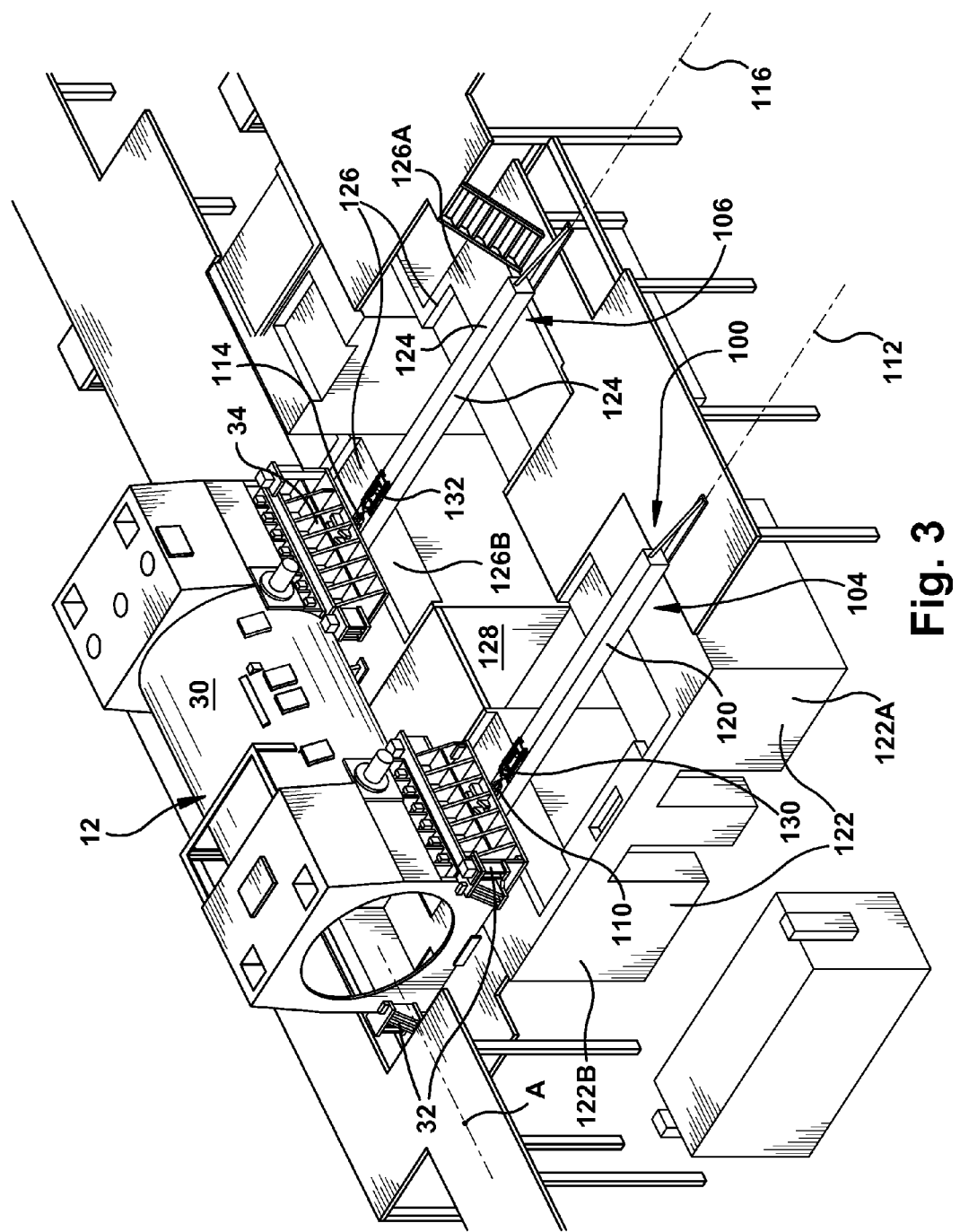
FIG. 3 shows a perspective view of the system of FIG. 2 after the lateral moving.

Referring now to the drawings, particularly to FIG. 1, an industrial machine 10 in one example may include a generator 12. In the example shown, generator 12 is illustrated as part of a single shaft STAG (steam turbine and gas turbine) combined-cycle system, including generator 12 in axial alignment with a gas turbine 14 and a steam turbine system 16. As illustrated, gas turbine 14 includes a compressor 18, a plurality of combustors 20 and a gas turbine section 22 for driving a rotor axially coupled to generator rotor 24. Generator rotor 24 at the opposite end of generator 12 is coupled to a series of high, intermediate and low pressure steam turbines 26 which may utilize the high temperature exhaust from the gas turbine and a heat recovery steam generator (not shown) to convert the gas turbine exhaust into useful steam for the bottoming portion of the combined cycle. It will be appreciated that generator rotor 24 is axially aligned with and coupled to the rotors of both gas turbine 14 and steam turbines 26. Referring to FIGS. 2 and 3, generator 12 includes a body 30 normally supported at a first axial position 112 by opposing feet 32, and at a second axial position 116 by opposing feet 34 (one occluded by body 30) on axially displaced machine foundations 122, 126. While embodiments of the invention will be described relative to a generator 12, it is emphasize that the teachings of the invention are equally applicable to a wide variety of industrial machines 10 including but not limited to: gas turbines, steam turbines, compressors, jet engines, water-powered turbines, etc.

With continuing reference to FIGS. 2 and 3, a perspective view of a system 100 for laterally moving industrial machine 10 (FIG. 1), e.g., generator 12 of a power plant, for maintenance is provided. In FIGS. 2 and 3, generator 12 is shown separated from turbines 14, 16 (FIG. 1), but the turbines would be located axially adjacent to generator 12, thus preventing removal of generator rotor 24 (FIG. 1). In FIG.

2, system 100 has been installed and generator 12 is in position to be laterally moved; and in FIG. 3, generator 12 has been laterally moved (illustrated as up on the page) using system 100. Generator 12 is shown with rotor generator 24 (FIG. 1) removed, but it would typically still be in place as generator 12 is situated. As used herein, "lateral" indicates a direction generally perpendicular to a longitudinal axis A of generator 12. In preparation for moving, all mechanical and electrical connections to generator 12 have been removed, including but not limited to foundation anchor bolts; rotor connections to the rotors of turbines 14, 16 (FIG. 1); bus duct; neutral grounding; instrumentation connections; lube oil, seal oil, cooling water, hydrogen and purge piping connections, etc. Other industrial machines 10 (FIG. 1) may have any necessary parts removed to allow for lateral moving in a similar manner.

Figure 4:
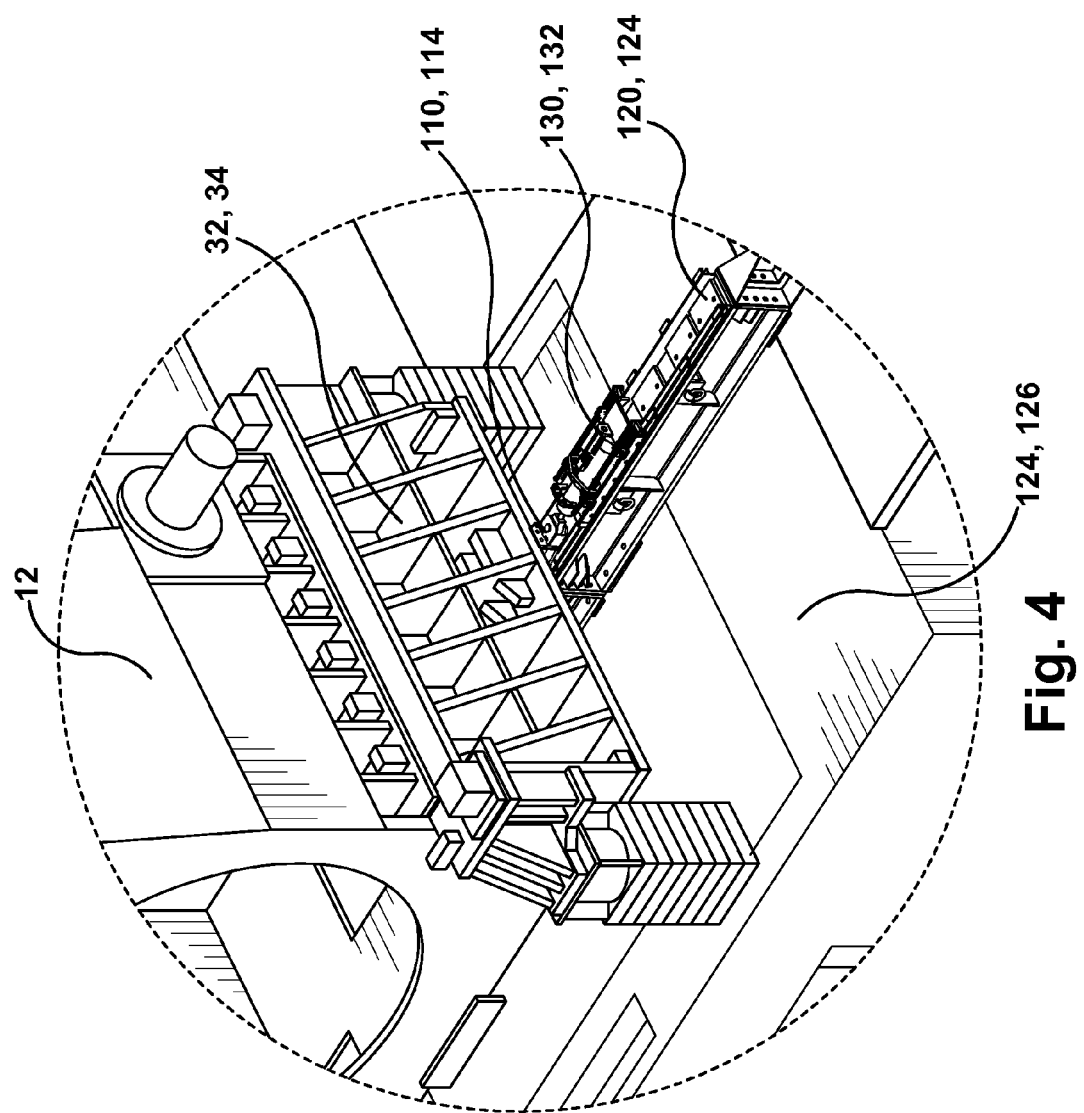
FIG. 4 shows a detailed perspective view of a linear actuator of the system for laterally moving an industrial machine according to embodiments of the invention.
Figure 19:
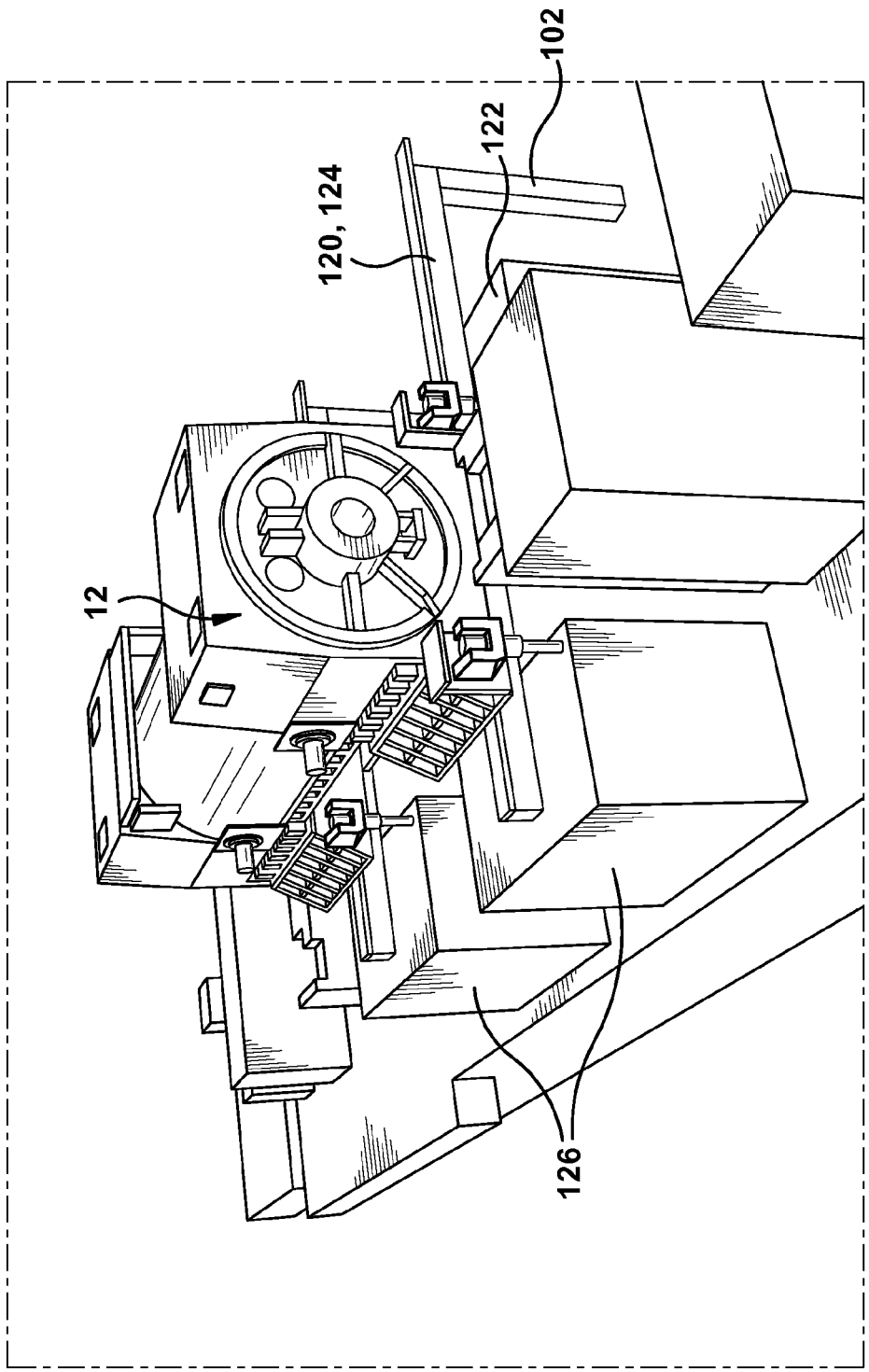
FIG. 19 shows a perspective view of the system including a vertical support column for one of the segmented support rails.

System 100 includes a pair of rail elements 104, 106 configured to be positioned laterally below and support generator 12. Rail elements 104, 106 allow machine 10 (FIG. 1), e.g., generator 12, to be moved laterally from a first operative position (FIG. 2) to a second, maintenance position (FIG. 3). A pair of linear actuators 130, 132 may be configured to laterally move the machine from the first, operative position to the second, maintenance position. Rail elements 104, 106 may interact with skids 110, 114 and support rails 120, 124. In this regard, system 100 may include a first skid 110 configured to couple laterally to an underside of generator 12 at first axial position 112, and a second skid 114 configured to couple laterally to an underside of generator 12 at second axial position 116. System 100 also includes a first segmented support rail 120 for positioning in sliding, aligned contact with first skid 110 and configured to be supported on a first machine foundation 122; and a second segmented support rail 124 for positioning in sliding, aligned contact with second skid 114 and configured to be positioned on a second machine foundation 126. Although machine foundation 122, 126 may take a variety of forms, in one embodiment, each machine foundation 122, 126 may include a pair of opposing piers 122A, 122B and 126A, 126B (latter hidden) on opposing sides of generator 12. Similar piers may be employed for different types of machines. As understood, power plant piers are conventionally reinforced concrete slabs engineered to support heavy, vibrating loads. Similar piers may be employed for other types of industrial machines. As understood, during operation of generator 12, feet 32, 34 of generator 12 sit atop piers 122A, 122B, 126A, 126B. As shown in FIG. 3 and as will be described herein, each support rail 120, 124 spans a space or gap 128 between a respective pair of opposing piers 122A, 122B, 126A, 126B in operation. As indicated in FIG. 2, each segmented support rail 120, 124 may also extend a distance beyond a periphery of generator 12 on at least one end. That is, rails 120, 124 stick out laterally beyond generator 12. Where necessary, as shown in FIG. 19, an optional vertical support column 102 may be provided for supporting a portion of a respective support rail 120, 124 extending beyond a respective machine foundation 122, 126. As shown in FIGS. 2 and 3, and in an enlarged perspective view in FIG. 4, system 100 also includes a pair of linear actuators 130, 132 configured to laterally move generator 12 as each skid 110, 114 slides along a respective segmented support rail 120, 124.

Referring to FIGS. 5-8, details of segmented support rails 120, 124 are illustrated. As shown in FIG. 5, each segmented support rail 120, 124 may include a number of segments 140 coupled end-to-end to form each rail. In FIG. 5, four segments 140A-D are illustrated. It is understood, however, that any number of segments 140 may be provided in any particular rail 120, 124. The number of segments 140 may be determined based on a number of factors such as but not limited to: the overall length required of rails 120, 124 to span gap 128; the available space adjacent generator 12 for staging of system 100; the size of generator 12; the lift capacity of an overhead crane (OHC) used to position rails segments 140; etc. Each segment 140 and thus rails 120, 124 may take the form of any now known or later developed structural element capable of withstanding the loads applied to the rails, such as but not limited to: an H-beam, an I beam, a box beam, etc. In the example shown, segments 140 include box beams having access openings 142 (FIG. 7) for accessing end flanges 144. End flanges 144 and other parts of segments 140 described herein may be coupled together in any known fashion, e.g., welding, fasteners, etc., capable of withstanding the stresses of operation. As shown for example in FIG. 8, buttresses 154 may be used where necessary for added strength.

Segmented support rails 120, 124 are assembled sequentially using segments 140. As illustrated in FIGS. 6 and 8, segments 140 may be fastened together using removable fasteners such as bolts that extend through mating openings in end flanges 144. In this fashion, rails 120, 124 may be readily assembled, disassembled and moved from location to location. As understood, various other fasteners may be employed, where possible. As shown in FIG. 5, at least one segment 140A-D of a selected segmented support rail 120, 124 may have a different length than at least one other segment 140A-D of the selected segmented support rail. For example, segment 140A is shown shorter than segment 140B, and segment 140C is shown shorter than all other segments. Different length segments 140A-D allow for assembly of rails 120, 124, as will be described in greater detail herein, to avoid having bolted joint connections over open areas, e.g., into space 128 between foundation piers, e.g., 122A, 122B. As shown best in FIGS. 6 and 7, each segment 140A-D may include a plurality of lift rings or eyes 146 for engaging by an OHC hook 148 (FIG. 7), which may be used to lift and position segments. Rings or eyes 146 may take a variety of forms, e.g., pivoting hooks, openings in segments 140, etc.

Figure 7:
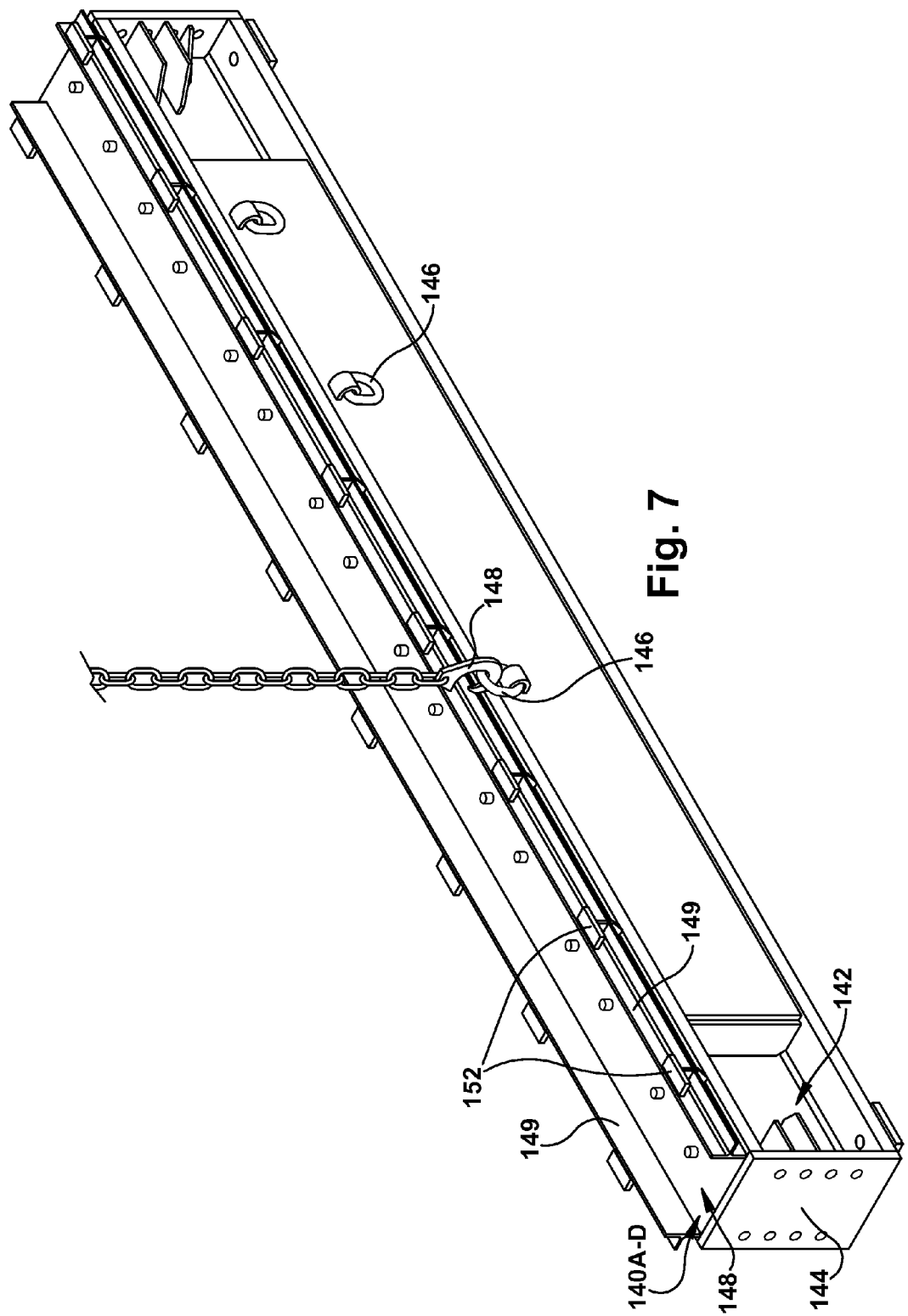
FIG. 7 shows a perspective view of a segment of the segmented support rail of the system according to embodiments of the invention.
Figure 8:
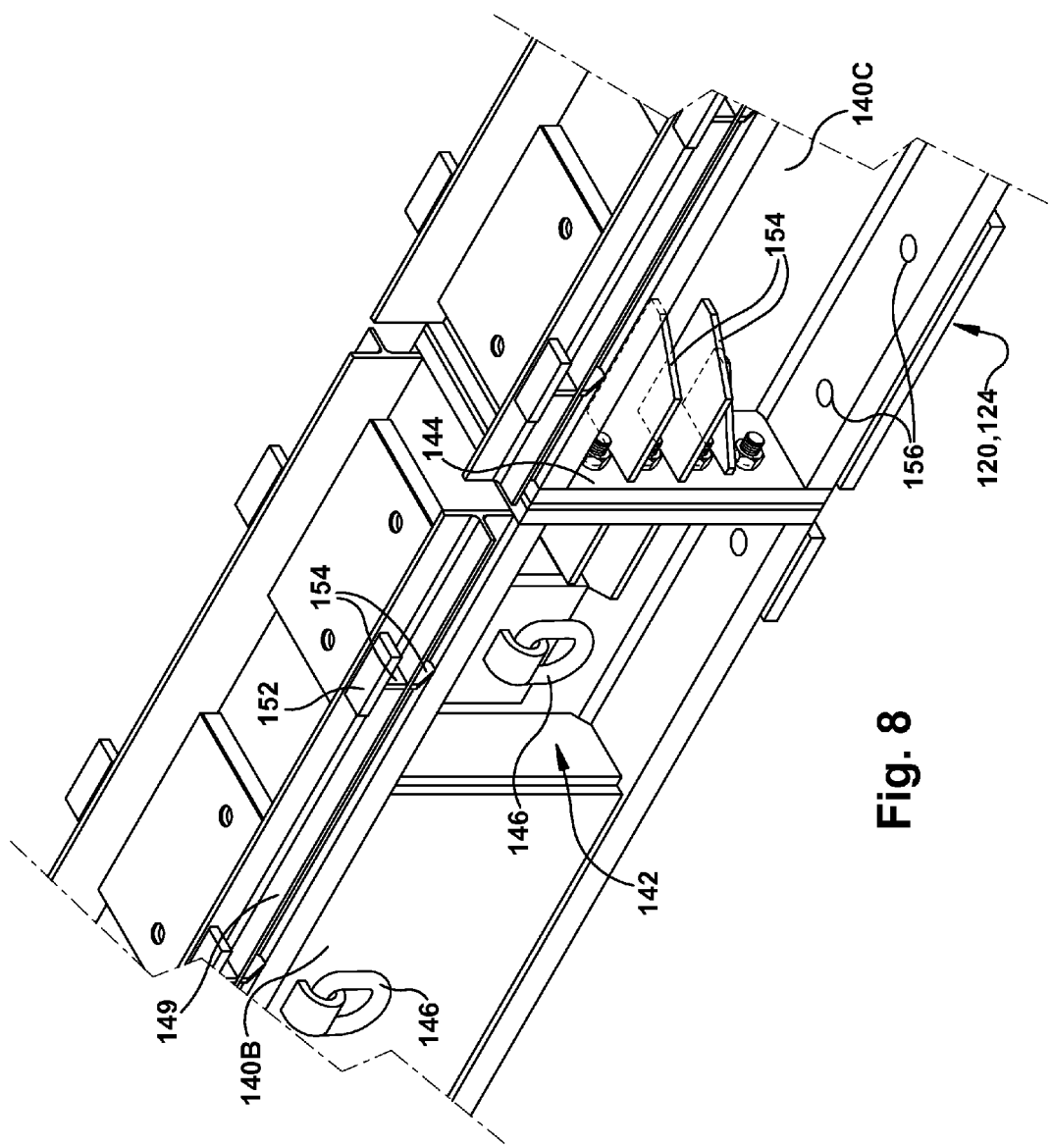
FIG. 8 shows a perspective view of a coupling of two segments of the segmented support rail of the system according to embodiments of the invention.

Referring to FIGS. 5-7, each segment 140A-D also includes a channel 148 in which a respective skid 110, 114 (FIGS. 9-10) may be guided. In one embodiment, channel 148 may be formed by upstanding rails 149 on opposing sides of the upper surface of segments 140A-D. Upstanding rails 149 may take a variety of forms such as flat plates, or as illustrated best in FIG. 7, as T-shaped rails set on edge. It is appreciated that channels 148 may also be formed in a variety of other fashions, e.g., machining a groove into a thick upper plate of segments 140, etc. Referring to FIGS. 5 and 6, each segment 140A-D may include at least one removable skid pad 150 such that each rail 120, 124 includes a plurality of removable skid pads 150 extending along a length thereof. Each skid pad 150 may include any now known or later developed material for ensuring smooth movement of skid 110, 114 (FIGS. 2 and 3) therealong. In one example, skid pad 150 may include a hard plastic such as polytetrafluoroethylene (PTFE). Each skid pad 150 may be coupled to a respective segment in any fashion such as but not limited to: threaded fasteners (shown), adhesives, tongue-and-groove couplings, etc.

Referring to FIGS. 6, 7 and 8, each segmented support rail 120, 124 may also include a plurality of spaced teeth 152 extending along a length thereof. Teeth 152 are provided for engagement by linear actuators 130, 132 and propulsion thereby, as will be described herein. In the embodiment shown, each tooth 152 may extend from a side of upstanding plates 149, and may be formed, for example, from metal plates welded to plates 149. For example, in one embodiment shown in FIG. 8, where upstanding plates 149 include a T-shaped rail positioned on edge, teeth 152 may extend from an upper edge of the T-shaped rail. Buttresses 154 may be employed, where necessary for added strength. In FIG. 8, buttresses 154 are shown below teeth 152, and extending under a base of the T-shaped rail. However, this arrangement is not necessary in all cases as teeth 152 may be arranged in a different location depending on how linear actuators 130, 132 mount to and move along rails 120, 124. At least one of the segments, e.g., 140C in FIG. 8, may include a plurality of fastener openings 156 for coupling the at least one segment to a respective machine foundation, e.g., 122A, 122B. Once in position as shown in FIGS. 2 and 3, selective segments that include fastener openings 156 may be fastened in place on a machine foundation 122, 126 to securely mount segmented rails 120, 124.

Referring to FIGS. 2, 3 and 5, a support rail extender 160 may be provided for temporary coupling to a first segment 140A of a selected segmented support rail 120, 124. As will be described herein, support rail extender 160 may be used to assist in having each rail 120, 124 span gap 128 between a pair of opposing piers, e.g., 122A, 122B, of one of machine foundations 122, 126 during installation of the selected segmented support rail. As support rail extender 160 does not actively support generator 12 in operation, it need not be made of the same material as rails 120, 124. In one embodiment, extender 160 may be made of composite or a light metal such as aluminum.

Figure 9:
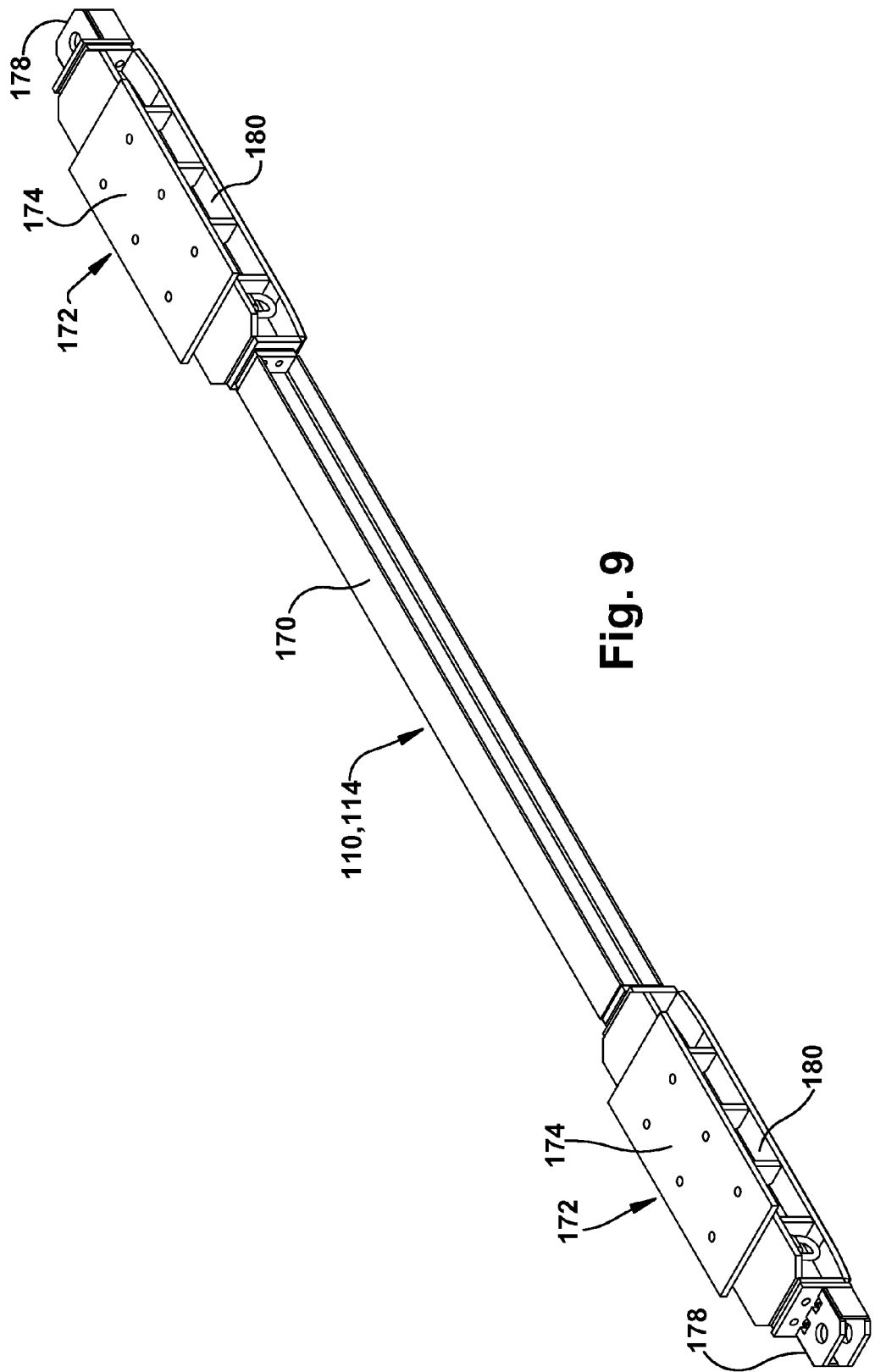
FIG. 9 shows a top perspective view of a skid of the system for laterally moving an industrial machine according to embodiments of the invention.
Figure 10:
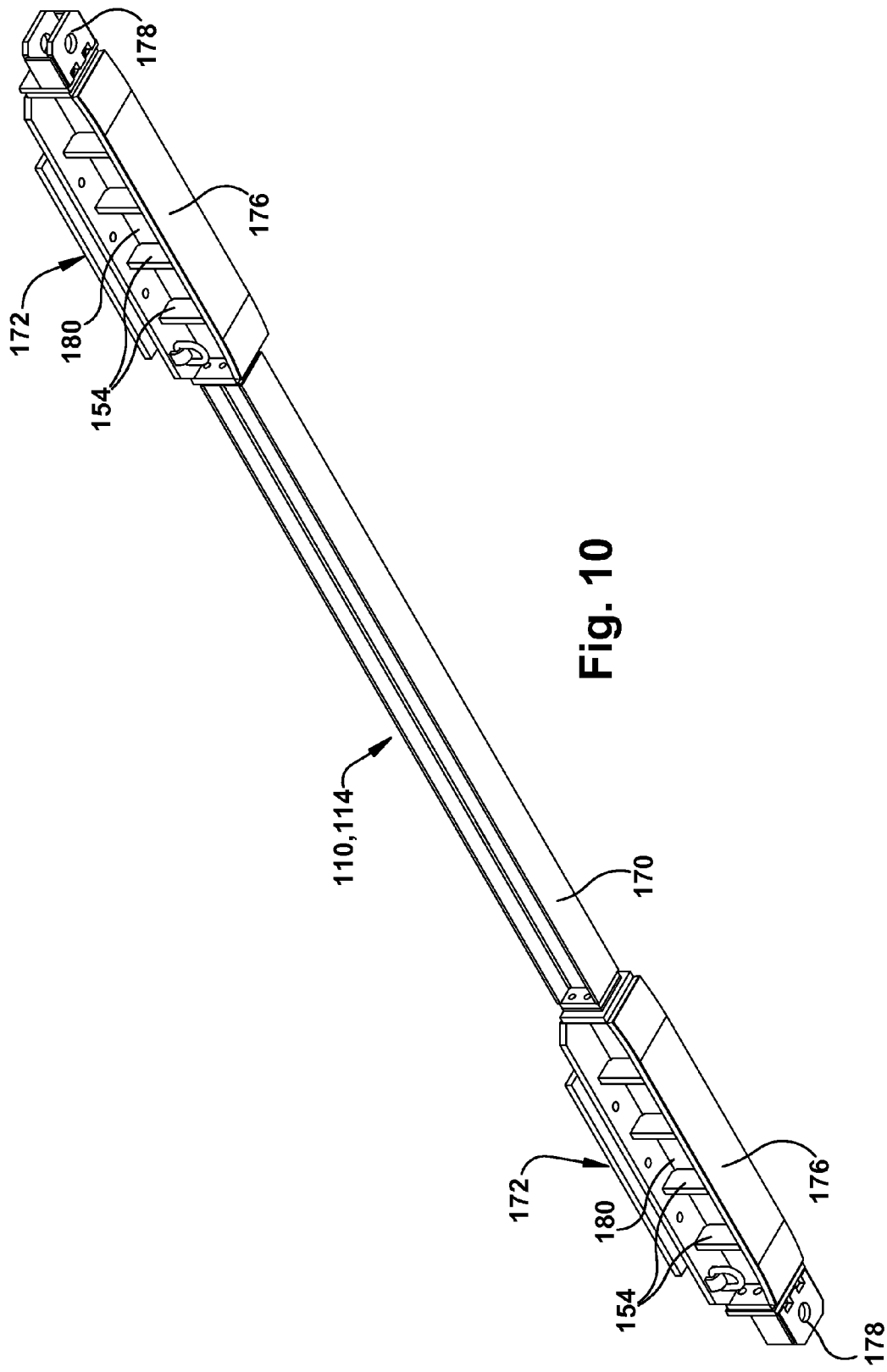
FIG. 10 shows a bottom perspective view of the skid of FIG. 9.

Referring to FIGS. 9 and 10, details of skids 110, 114 are illustrated. Skids 110, 114 are configured to mount to an underside of generator 12 and to slidingly support generator 12 on segmented support rails 120, 124. FIG. 9 shows a top perspective view of skids 110, 114, and FIG. 10 shows a bottom perspective view of skids 110, 114. Each skid 110, 114 includes a beam 170, and a skid member 172 at each end of the beam. Beam 170 may be any elongated structural component and may take any of the forms listed herein relative to rails 120, 124. Each skid member 172 includes a mount 174 (FIG. 9) for coupling the skid member to a foot 32, 34 of generator 12 and an opposing, skid plate 176 (FIG. 10) for sliding engagement with a respective segmented support rail 120, 124, i.e., on channel 148. Mounts 174 may include, for example, metal plates including fastener openings for, e.g., bolting, to a bottom of generator feet 32, 34. As understood, a large variety of alternative mechanisms may be employed to mount skids 170 to feet 32, 34, e.g., tongue-and-groove mounts, etc. Each skid plate 176 may include any form of skid plate material capable of sliding interaction with skid pads 150 of segmented support rails 120, 124. In one embodiment, skid members 172 may include metal wear plates made of, for example, stainless steel; however, a large variety of alternatives may be employed such as but not limited to hard plastics such as PTFE. Each skid member 172 may further include an actuator coupling 178 for selective coupling to one of the pair of linear actuators 130, 132 (FIG. 3). Any necessary coupling structure 180 may be provided to properly support and position mount 174 relative to skid member 172 and/or actuator coupling 178, e.g., with backing plates for mount 174 and/or skid member 172, and any necessary buttresses 154 (FIG. 10) for added strength. Skid members 172 may be coupled to beam 170 using any solution, e.g., bolting, welding, etc. Skids 110, 114 may have different structure, coupling points, coupling mechanisms, etc., depending on the type of industrial machine to which they are applied.

Figure 11:
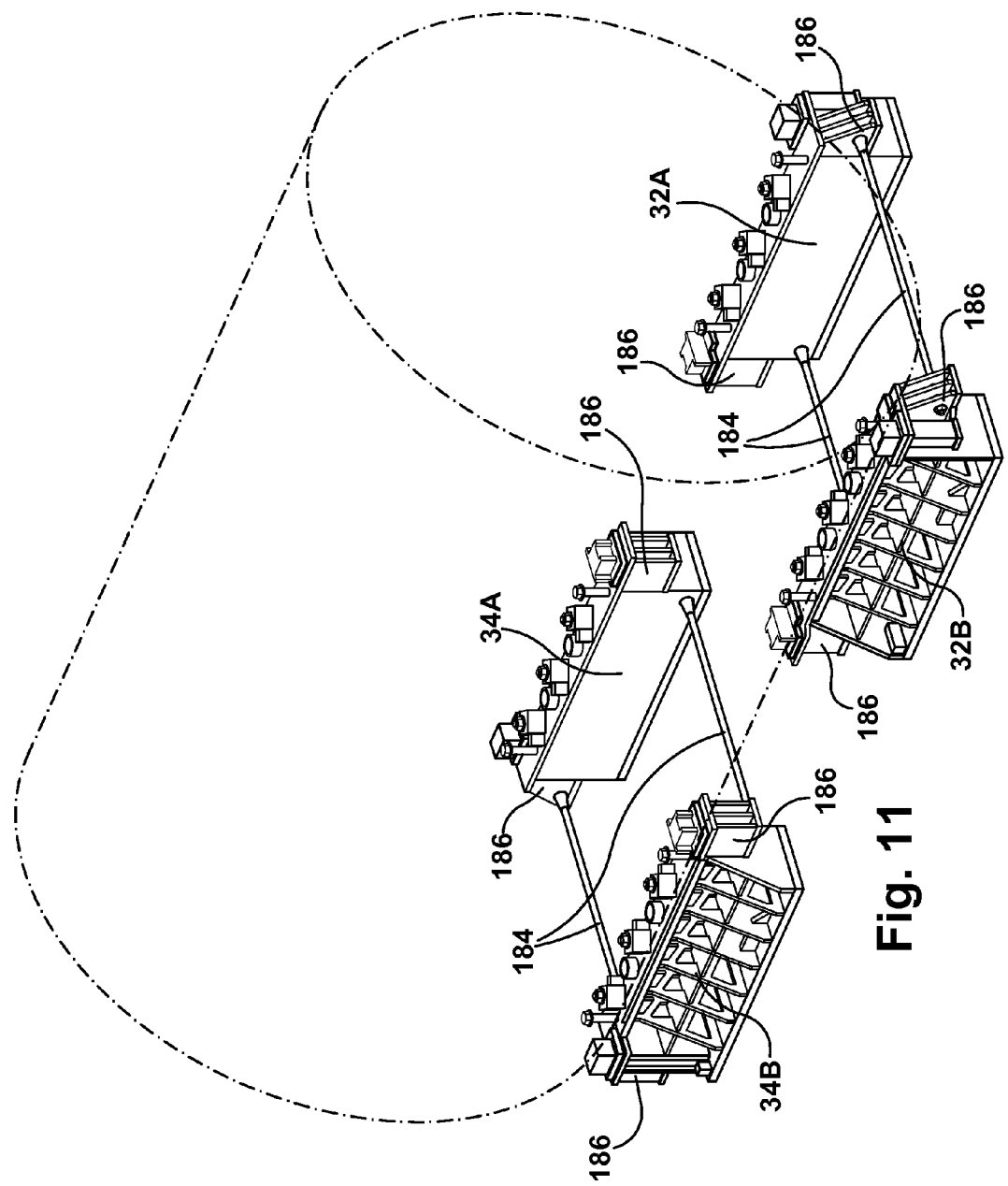
FIG. 11 shows a perspective view of a set of feet for the industrial machine including lateral support members of the system according to embodiments of the invention.

Although not part of skids 110, 114, as shown in FIG. 11, system 100 may also include a lateral support member 184 for coupling opposing feet, e.g., 32A, 32B or 34A, 34B of the industrial machine, e.g., generator (shown in phantom in FIG. 11). Lateral support member 184 may be provided to add support to feet 32, 34 by preventing bowing of the feet when under lateral movement provided by system 100. Lateral support member 184 may include, for example, one or more metal bars or rods that couple to feet 32, 34 in any fashion, e.g., bolting, welding, etc. As also shown in FIG. 11, each foot 32, 34 may also include a jacking shelf 186 extending from each axial end thereof for lifting engagement with a climbing jack, as will be described herein. Support member(s) 184 may couple to the bodies of feet 32, 34 and/or to jacking shelves 186.

With further regard to segmented support rails 120, 124 and skids 110, 114, while rails 120, 124 have been described as including channels 148 into which skid members 172 of skids 110, 114 fits for sliding engagement, it is understood that the channels' position could be switched within the scope of the invention. In this case, skids 110, 114 would include the channel and fit over rails 120, 124.

Figure 12:
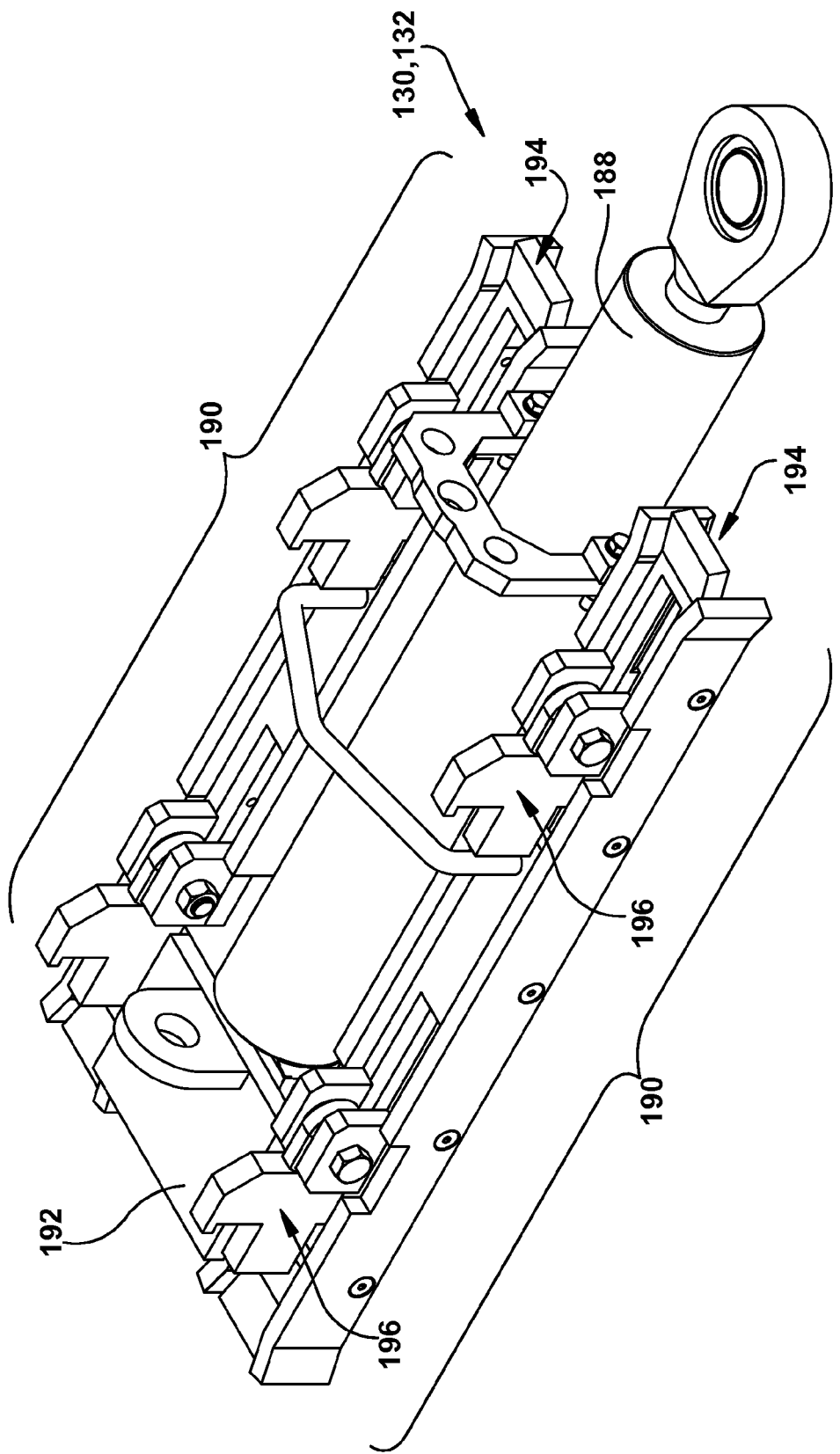
FIG. 12 shows a perspective view of a linear actuator of the system according to embodiments of the invention.

Turning to FIG. 12, a perspective view of one embodiment of a linear actuator 130, 132 is illustrated. As will be described herein, and as shown in FIGS. 2 and 3, pair of linear actuators 130, 132 may include a first linear actuator 130 coupled between first segmented support rail 120 and first skid 110, and a second linear actuator 132 coupled between second segmented support rail 124 and second skid 114. Each linear actuator may include any now known or later developed linear actuation mechanism 188 capable of applying sufficient force to laterally move industrial machine 10 (FIG. 1), e.g., generator 12, on support rails 120, 124 such as but not limited to a hydraulic cylinder, pneumatic cylinder, etc. In operation, linear actuators 130, 132 would be positioned in parallel on respective rails 120, 124 and coupled to respective skids 110, 114. Upon activation, linear actuators 130, 132 are synchronized with one another so as to slidingly push industrial machine 10 (FIG. 1), e.g., generator 12, along rails 120, 124 in line with one another, i.e., maintaining the parallel positioning. Any now known or later developed controls may be employed to operate linear actuators 130, 132. In one embodiment, each linear actuator 130, 132 can be activated to stroke to move generator 12 and then be manually re-positioned, after cylinder retraction, relative to each respective rail 120, 124 for re-activation. In another embodiment, however, in order to automate the progression of generator 12, each linear actuator 130, 132 may include a stepper 190 for automatically sequentially moving generator 12 and each linear actuator 130, 132 along rails 120, 124. Details of how stepper 190 functions will be described relative to a method described herein.

Figure 13:
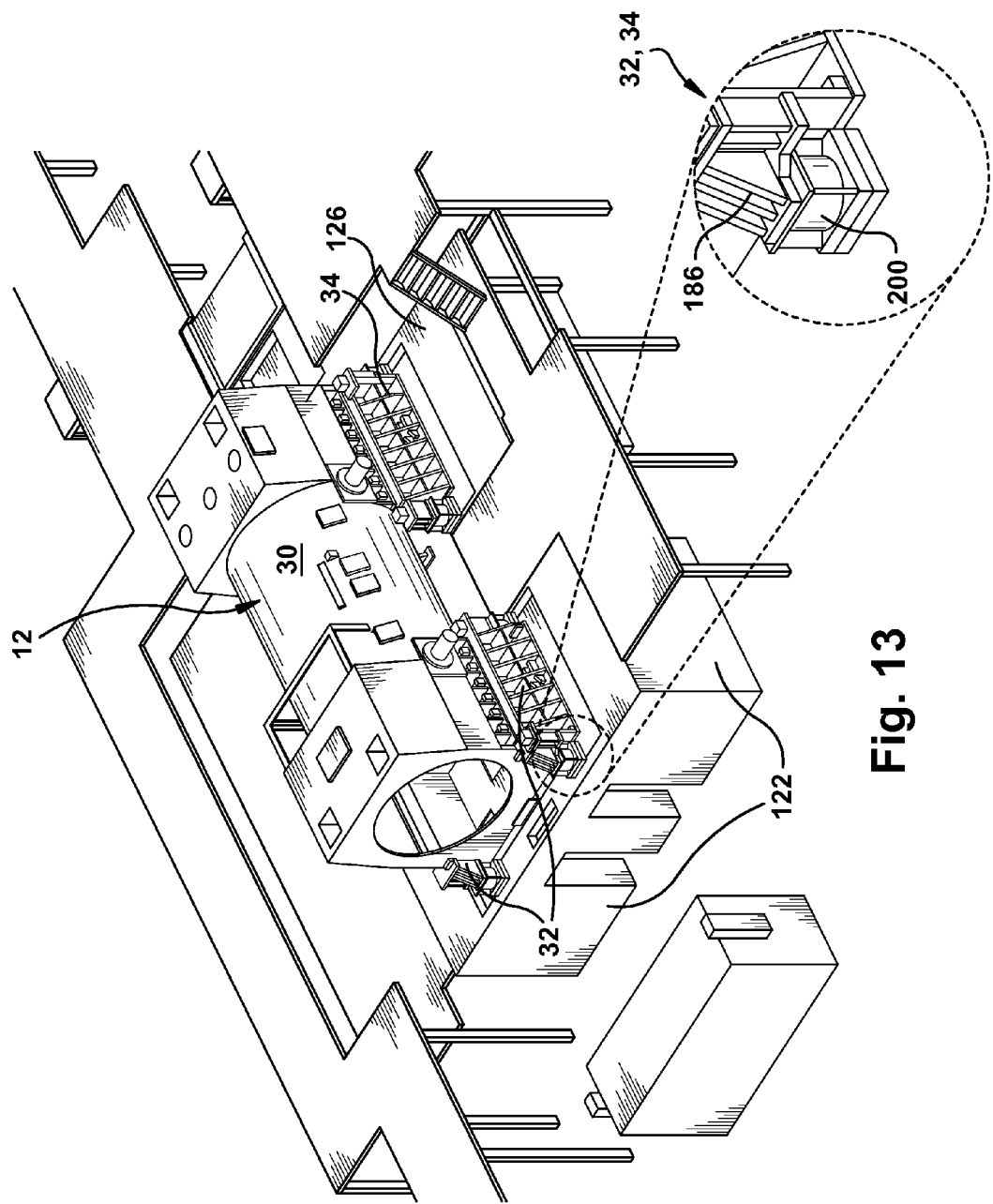
FIGS. 13 and 14 show perspective views of a step of raising the industrial machine using the system according to embodiments of the invention.
Figure 14:
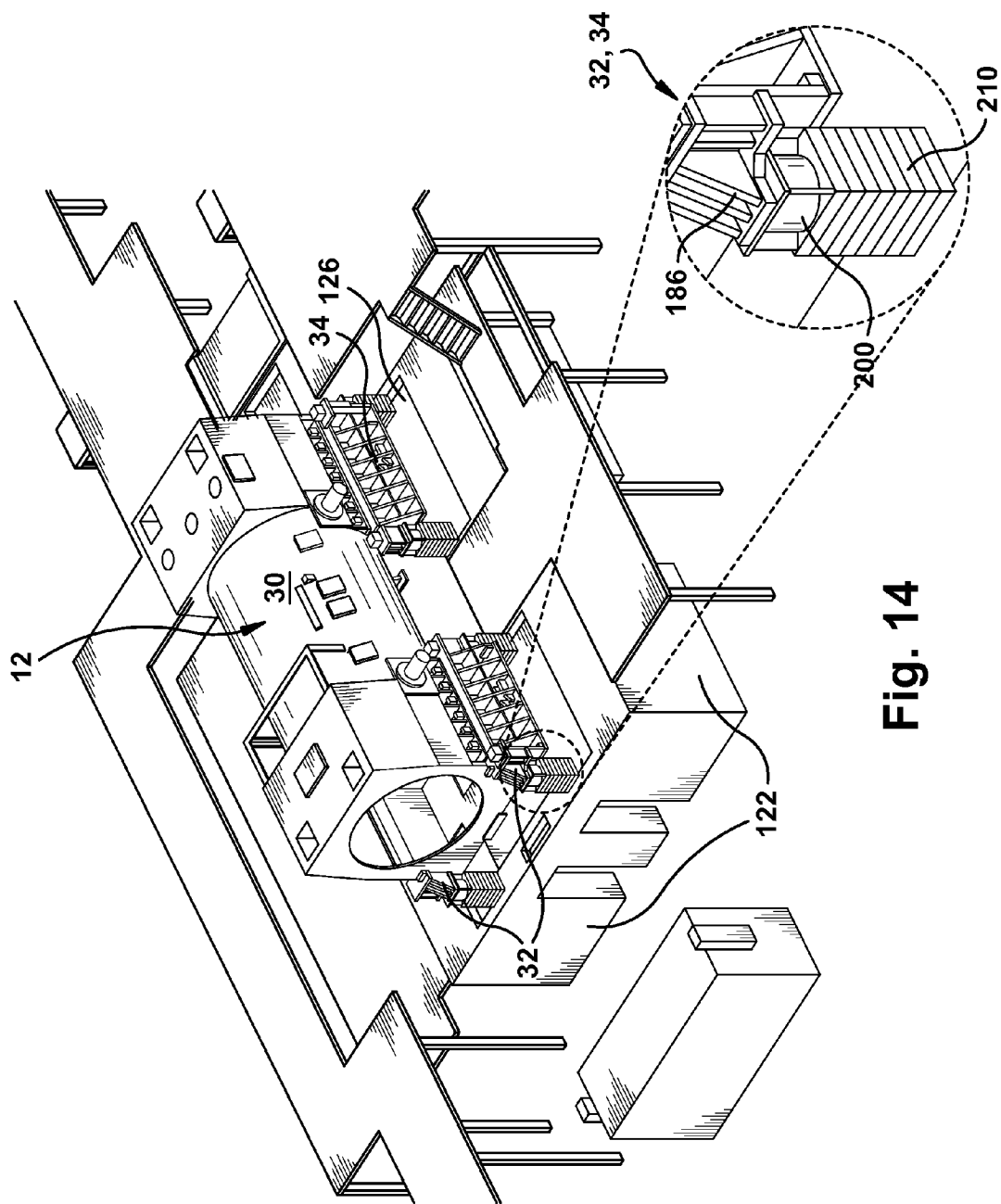

Returning to FIGS. 2 and 3 in conjunction with FIGS. 13-18, a method of laterally moving an industrial machine 10 (FIG. 1), such as a generator in a power plant, for maintenance will now be described. The method includes steps for installing and using system 100. Although the method is shown applied relative to a generator 12, it may be applied to a variety of other industrial machines as listed herein. Turning to FIGS. 13 and 14, in preparation for moving of industrial machine 10 (FIG. 1), e.g., generator 12, all mechanical and electrical connections to the industrial machine are removed, including but not limited to for generator 12: foundation anchor bolts; rotor connections to the rotors of turbines 14, 16; bus duct; neutral grounding;

instrumentation; lube oil, seal oil, cooling water, hydrogen and purge piping connections, etc.

In a first step, shown in FIGS. 13 and 14, generator 12 is raised above a pair of machine foundations 122, 126, each machine foundation including a pair of opposing piers 122A, 122B, 126A, 126B (FIGS. 2-3) on opposite lateral sides of the generator. Any bolts or other fasteners mounting generator 12 in place are removed prior to the raising. As shown in FIG. 13, system 100 may also include a plurality of climbing jacks 200 for raising generator 12 in a synchronized manner, maintaining generator 12 horizontally level in both axial and transverse planes as it is moved to a raised position (FIG. 14) above the first and second machine foundations 122, 126. That is, generator 12 raising may include using climbing jacks 200 for raising the generator in a synchronized manner to a raised position (FIG. 14) above the first and second machine foundations 122, 126. In the raised position, as will be discussed, installation of first and second skids 110, 114 and first and second segmented support rails 120, 124 may be allowed. In one embodiment, eight (8) climbing jacks available from Advanced Lifting Equipment of Devon, England or Enerpac of Menomonee Falls, Wis., USA, may be employed. Climbing jacks 200 are set under each jacking shelf 186 as shown in the insets of FIGS. 13 and 14. See also FIG. 11 for locations of jacking shelves 186. As also shown in FIG. 11, where necessary, the method may include coupling opposing feet 32A, 32B and 34A, 34B of generator 12 together with support member(s) 184 prior to the raising. Support member(s) 184 may be required for added strength to hold opposing feet together. System 100 may also include cribbing 210 for supporting generator 12 during raising thereof to the raised position, and in the raised position. That is, as generator 12 is raised, cribbing 210 can be placed beneath generator 12, e.g., beneath jacking shelves 186, for maintaining the generator in the raised position (or an intermediate position between lowered and raised positions). Once in the raised position and with sufficient cribbing 210 (see FIG. 14) in place to support generator 12 in the raised position, climbing jacks 200 may be de-energized.

Turning to FIGS. 2 and 3 in conjunction with FIGS. 15-18, in a next step, first segmented support rail 120 may be installed at first axial position 112 (FIGS. 2 and 3) of generator 12 and supported laterally by the opposing piers 122A, 122B of one of the machine foundations 122, 126. In a similar fashion, second segmented support rail 124 may be installed at second axial position 116 (FIGS. 2 and 3) of generator 12 and supported laterally by opposing piers 126A, 126B (FIGS. 2 and 3) of the other of the machine foundations 126. As noted above, in a final position, each segmented support rail 120, 124 extends a distance beyond a periphery of the generator on at least one end.

Figure 15:
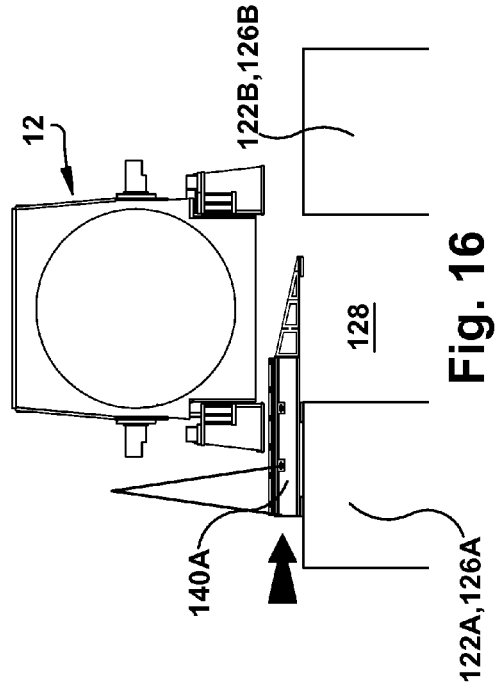
FIGS. 15-18 show end views of the steps of installing a segmented support rail of the system according to embodiments of the invention.

FIGS. 15-18 show an illustrative embodiment of installing segmented support rails 120, 124. In FIGS. 15-18, generator 12 is in the raised position above piers 122A, 122B, 126A, 126B. In FIG. 15, a first segment 140A of a segmented support rail 120 or 124 is positioned by an overhead crane (OHC) (indicated by triangular lines) coupled by hooks 146 (FIG. 7) on one of the foundation piers 122A, 126A. As will be described, segments 140 of rails 120, 124 are sequentially installed. A preliminary step to segment installation may include temporarily coupling support rail extender 160 to first segment 140A. As shown in FIGS. 15-18, first segment 140A of the rail 122, 124 shown has support rail extender 160 coupled thereto for installation. As noted, support rail extender 160 assists in having each rail 120, 124 span gap 128 between a pair of opposing piers, e.g., 122A, 122B, of one of machine foundations 122, 126 during installation of the selected segmented support rail.

Figure 17:
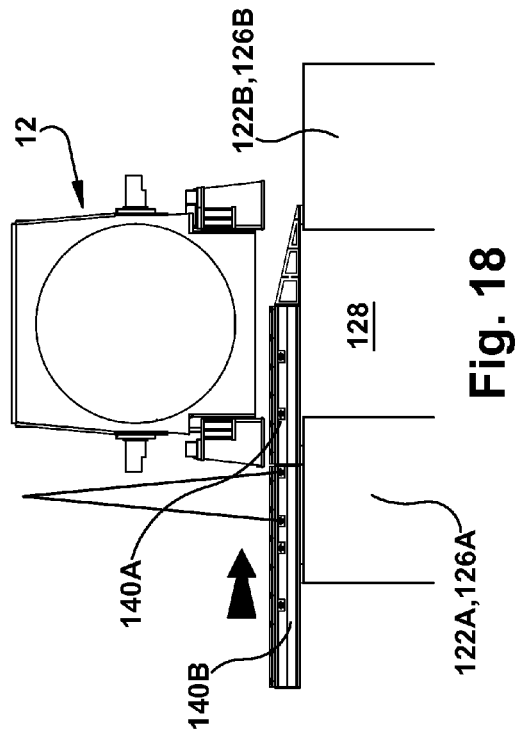
Figure 16:
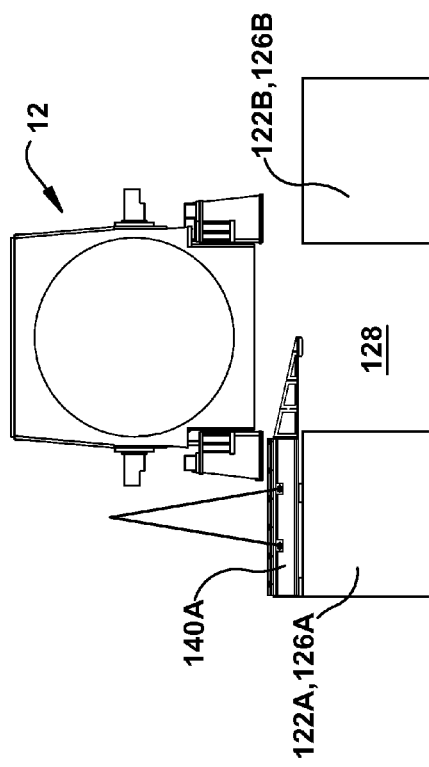
Figure 18:
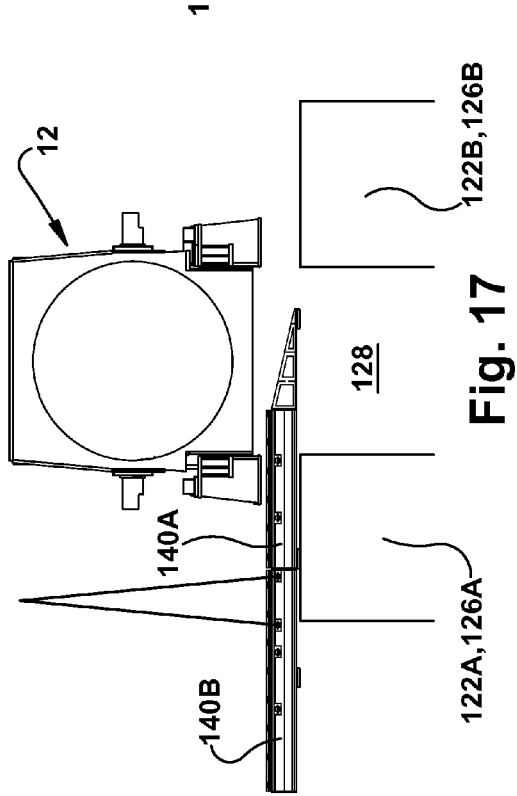

FIG. 16 shows initial advancement of first segment 140A under generator 12. First segment 140A may be advanced by use of the OHC in a known fashion. As shown, support rail extender 160 does not span gap 128 at this stage. FIG. 17 shows coupling of a second segment 140B to first segment 140A. Segments 140A, 140B may be coupled as described herein, e.g., by bolting flanges 144 (FIG. 8) together. Once coupled, as shown in FIG. 18, the OHC may advance segments 140A, 140B under generator 12. As shown, support rail extender 160 now allows spanning of gap 128, i.e., extender 160 rests on opposing pier 122B, 126B supporting the portion of the rails already coupled together. In this setting, extender 160 allows grasping by the OHC (from right side of FIG. 18) such that segments 140A, 140B may be more readily pulled under generator 12. Additional segments, e.g., segments 140C, 140D (FIG. 5), may then be sequentially added in a similar fashion, until rails 120, 124 are complete and supported on the piers, as shown in FIG. 2. Although not necessary, once rails 120, 124 are installed, extender 160 may be removed.

As shown in FIG. 2, first skid 110 may be coupled laterally to an underside of generator 12 and in alignment with first segmented support rail 120. In a similar fashion, second skid 114 may be coupled laterally to an underside of generator 12 at second axial position 116 and in alignment with second segmented support rail 124. Here, the raised position of generator 12 allows skids 110, 114 to be slid under generator 12 in channels 148 (FIG. 5) of rails 120, 124. Generator 12 may then be slightly lowered, or skids 110, 114 slightly raised, such that mounts 174 (FIG. 9) may be coupled to respective, axially displaced feet 32, 34 of generator 12, as described herein.

Next, as shown in FIG. 2, generator 12 is lowered such that each skid 110, 114 is aligned in contact with a respective support rail 120, 124. Generator 12 may be lowered by activation of climbing jacks 200 (see inset FIGS. 13, 14) and gradual lowering it with removal of cribbing 210 (see inset FIG. 14) until generator 12 is supported by rails 120, 124 and skids 110, 114. At this point, the jacks and any additional cribbing can be removed. Any necessary leveling of rails 120, 124 and/or skids 110, 114 may be performed as the lowering occurs per conventional rigging practices. At this stage, generator is supported by system 100, i.e., by skids 110, 114 sitting in channels 148 of segmented support rails 120, 124, and the rails being supported on respective opposing piers 122A, 122B and 126A, 126B.

FIG. 3 shows applying a force to laterally move generator 12 as each skid 110, 114 slides along a respective segmented support rail 120, 124. The force applying includes using linear actuators 130, 132 coupled between each segmented support rail 122, 124 and a respective skid 110, 114. More particularly, the force applying may include using first linear actuator 130 coupled between first segmented support rail 122 and first skid 110, and second linear actuator 132 coupled between second segmented support rail 124 and second skid 114. Actuators 130, 132 are synchronized with one another to ensure even movement of each end of generator 12. As will be described, the force applying may include sequentially stepping each linear actuator 130, 132 along a respective segmented support rail. Slide pads 150 (FIG. 5) and skid plates 176 (FIG. 10) allow sliding motion of skids 110, 114, and hence generator 12 to which they are mounted as part of skids 110, 114, to slidingly move along segmented support rails 120, 124 to the position shown in FIG. 3.

Referring again to FIG. 12, where linear actuators 130, 132 are employed with steppers 190, each stepper may engage with plurality of teeth 152 on rails 120, 124 to step the linear actuators in a synchronized manner along the segmented support rail. Steppers 190 may be provided on each side of actuation mechanism 188 to ensure actuators correctly align with rails 120, 124. A wide variety of steppers 190 may be employed with system 100 (FIG. 2). In the example shown, a stepper 190 may include an actuation mechanism mount 192 to mount the stepper to actuation mechanism 188 at one end, and a ratchet system 194 extending along mechanism 192. Each ratchet system 194 includes one or more ratchet elements 196, each which engage with a respective tooth 152 (FIGS. 5 and 6) in response to actuation mechanism 188 extending to push generator 12 along rails 120, 124. In contrast, ratchet elements 196 pivot to pass over a respective tooth 152 in response to actuation mechanism 188 retracting. In this latter movement, ratchets 196 are biased insufficiently to have their position maintained against the frictional force of the weight of generator 12. Consequently, as actuation mechanism 188 retracts, the lateral position of linear actuator 130, 132 relative to a respective rail 122, 124 is advanced. As linear actuators 130, 132 advance, ratchets 196 pass over one or more teeth 152 until actuation mechanism 188 is fully retracted. Extension of actuation mechanism 188 again seats at least one ratchet 196 against a respective tooth 152 such that, once again, actuation mechanism 188 pushes generator 12 along support rails 120, 124.

Once generator 12 is in the position shown in FIG. 3, generator 12 is supported by rails 120, 124 (perhaps with vertical support column 102 (FIG. 19) and a set of piers, e.g., 122A, 126A. In this position, there is nothing blocking access to industrial machine 10 (FIG. 10, e.g., generator rotor 24 (FIG. 1), and any repair and/or maintenance can be readily performed. Skids 110, 114 and/or rails 120, 124 may be locked in position per conventional rigging practices so as to not allow movement of industrial machine 10 (e.g., generator 12) during repair and/or maintenance, e.g., removal of generator rotor 24 (FIG. 1). Once repair and/or maintenance is performed, or if generator rotor 24 (FIG. 1) is to be removed for a sustained period of time, the industrial machine (generator 12) can be returned to its original position (FIG. 2) by reversing the order of steps described above. That is, linear actuators 130, 132 can be coupled to rails 120, 124 on the opposite side from that shown in FIG. 3 and generator 12 slidingly forced along rails 120, 124 to the position shown in FIG. 2. Generator 12 can then be raised such that rails 120, 124 and skids 110, 114 can be removed. Generator 12 is then lowered, remounted to foundations 122, 126 and re-coupled for operation or temporary storage.

The foregoing description and drawings show some of the processing associated according to several embodiments of this disclosure. In this regard, the progression of drawings and their related description represent steps associated with embodiments of the method described. It should also be noted that in some alternative implementations, the acts noted in the drawings or description may occur out of the order noted in the figure or, for example, may in fact be executed substantially concurrently or in the reverse order, depending upon the act involved. For example, in an alternative embodiment, skids 110, 114 may be mounted to feet 32, 34 of generator 12 prior to installation of support rails 120, 124.

System 100 as described herein provides for laterally moving an industrial machine 10 such as a generator 12 for repair or maintenance. System 100 is lower cost compared to conventional gantry systems and can be assembled/disassembled more quickly than gantry systems. System 100 is also relatively inexpensive to manufacture compared to conventional permanently mounted movable slabs or heavy duty gantries. In addition, system 100 is relatively quick to set up due, in part, to the rails being segmented. System 100 also may reduce the amount of space necessary for repair and/or maintenance of an industrial machine as only lateral space for the machine adjacent to its normal operation position is necessary. For example, no additional space for cranes, gantries, movable slabs, etc., is necessary. Furthermore, many jurisdictions require health and safety certifications of equipment such as system 100. Since system 100 is removable, the certifications can be performed during down time rather than having to be performed in-situ, which reduces set up time and costs.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or generators, but do not preclude the presence or addition of one or more other features, integers, steps, operations, elements, generators, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

What is claimed is:

1. A method of laterally moving an industrial machine for maintenance, the method comprising:
   supporting the industrial machine on a pair of rail elements configured to be positioned laterally below and support the industrial machine, the rail elements allowing the industrial machine to be moved laterally from a first operative position to a second, maintenance position by interacting with a pair of skids configured to couple laterally to an underside of the industrial machine and a pair of segmented support rails, wherein the supporting includes:
      raising the industrial machine above a pair of machine foundations, each machine foundation including a pair of opposing piers on opposite lateral sides of the industrial machine;

installing a first segmented support rail at a first axial position of the industrial machine and supported laterally by the opposing piers of one of the machine foundations;

installing a second segmented support rail at a second axial position of the industrial machine and supported laterally by opposing piers of the other of the machine foundations, each segmented support rail extending a distance beyond a periphery of the industrial machine on at least one end;

coupling a first skid laterally to an underside of the industrial machine and in alignment with the first segmented support rail;

coupling a second skid laterally to the underside of the industrial machine at the second axial position and in alignment with the second segmented support rail;

lowering the industrial machine such that each skid is aligned in contact with a respective support rail; and moving the industrial machine laterally using a pair of linear actuators, each linear actuator engaging a respective rail element and configured to laterally move the industrial machine from the first, operative position to the second, maintenance position by interacting with a respective skid of the pair of skids, wherein the moving includes applying a force using the pair of linear actuators to laterally move the industrial machine as each skid slides along a respective segmented support rail.

2. The method of claim 1, wherein each skid coupling includes coupling the skid to a respective, axially displaced foot of the industrial machine.

3. The method of claim 1, wherein each segmented support rail installing includes installing the segmented support rail in sequential segments.

4. The method of claim 1, further comprising temporarily coupling a support rail extender to a first segment of a selected segmented support rail for spanning a gap between a pair of opposing piers of one of the machine foundations during the installing of the selected segmented support rail.

5. The method of claim 1, wherein the pair of linear actuators includes a first linear actuator coupled between the first segmented support rail and the first skid, and a second linear actuator coupled between the second segmented support rail and the second skid, and wherein the first and second linear actuator are synchronized with one another.

6. The method of claim 5, wherein the force applying includes sequentially stepping each linear actuator along a respective segmented support rail.

7. The method of claim 1, wherein the industrial machine raising includes using a plurality of climbing jacks for raising the industrial machine in a synchronized manner to a raised position above the first and second machine foundations.

8. The method of claim 7, further comprising placing cribbing beneath the industrial machine for maintaining the industrial machine in the raised position.

9. The method of claim 1, further comprising coupling opposing feet of the industrial machine together with a support member prior to the raising.

10. A method of laterally moving an industrial machine for maintenance, the method comprising:

raising the industrial machine above a pair of machine foundations, each machine foundation including a pair of opposing piers on opposite lateral sides of the industrial machine;

installing a first segmented support rail at a first axial position of the industrial machine and supported laterally by the opposing piers of one of the machine foundations;

installing a second segmented support rail at a second axial position of the industrial machine and supported laterally by opposing piers of the other of the machine foundations, each segmented support rail extending a distance beyond a periphery of the industrial machine on at least one end;

coupling a first skid laterally to an underside of the industrial machine and in alignment with the first segmented support rail;

coupling a second skid laterally to the underside of the industrial machine at the second axial position and in alignment with the second segmented support rail;

lowering the industrial machine such that each skid is aligned in contact with a respective support rail; and moving the industrial machine laterally using a pair of linear actuators, each linear actuator coupled to a respective skid and configured to laterally move the industrial machine from a first, operative position to a second, maintenance position as each skid slides along a respective segmented support rail.

11. The method of claim 10, wherein each skid coupling includes coupling the skid to a respective, axially displaced foot of the industrial machine.

12. The method of claim 10, wherein each segmented support rail installing includes installing the segmented support rail in sequential segments.

13. The method of claim 10, further comprising temporarily coupling a support rail extender to a first segment of a selected segmented support rail for spanning a gap between a pair of opposing piers of one of the machine foundations during the installing of the selected segmented support rail.

14. The method of claim 10, wherein the pair of linear actuators includes a first linear actuator coupled between the first segmented support rail and the first skid, and a second linear actuator coupled between the second segmented support rail and the second skid, and wherein the first and second linear actuator are synchronized with one another.

15. The method of claim 14, wherein the force applying includes sequentially stepping each linear actuator along a respective segmented support rail.

16. The method of claim 10, wherein the industrial machine raising includes using a plurality of climbing jacks for raising the industrial machine in a synchronized manner to a raised position above the first and second machine foundations.

17. The method of claim 16, further comprising placing cribbing beneath the industrial machine for maintaining the industrial machine in the raised position.

18. The method of claim 10, further comprising coupling opposing feet of the industrial machine together with a support member prior to the raising.

* * * * *